(12) United States Patent
Davis et al.

(10) Patent No.: X8040
(45) Date of Patent: Mar. 3, 1834

(54) THRASHING MACHINE

(76) Inventors: Daniel Davis; James Holmes

Daniel Davis & James Holmes
Letters Patent - Dated March 3rd 1834.

The schedule referred to in these Letters Patent, and making part of the same; containing a description in the words of the said Daniel Davis and James Holmes themselves, of their improvement in the Thrashing Machine.

---

1st. The frame on which the Horse or propelling power is erected, consists of two parallel sills, each thirteen feet six inches long, and four inches broad, by eight inches deep; tenoned together by three pieces of timber of the same dimensions as the sills; so that the frame covers an area of thirteen feet, six inches in length, by three feet nine inches in width. At one end of this frame upon four blocks of four inches in height is placed a small frame of four feet ten inches long, and three feet nine inches in width or breadth; the centre piece of which extends to the outer edge of the master wheel. On this frame is erected the whole of the machinery or gearing which propels the thrashing cylinder. On the inner end of this smaller frame, is fixed by three screw bolts, a metallic bracket with three legs. This bracket receives sinks or steps supporting the upper end of a shaft of the bevel wheel; upon which is staked a pinion, working in the master wheel, and to which the master wheel runs horizontally. The master wheel has its rim of cast metal made to receive arms of wood which are crossed immediately in the centre and which are fastened to the rim by screw bolts; It has one hundred and four teeth, and works in the pinion before mentioned, which has fourteen teeth of two inches and a quarter pitch. On the same shaft on which is the pinion, and underneath it is the bevel wheel, containing forty teeth, which works in a bevel pinion of twelve teeth, fixed on a horizontal shaft of wood or metal, running equi-distant from each of the sill frames to its outer extremity. This horizontal shaft has attached to it, a drum or pully of forty eight inches diameter, which by a band or other gearing connects the before described part of the - machine with the threshing cylinder_

The threshing cylinder is of metal, is constructed with an axle of one inch and a quarter diameter, and generally two feet four inches long, but which may be longer or shorter as may be required, its diameter is sixteen inches, and is formed of three metallic heads which are staked on the axle. These metallic heads, have on their rims, six grooves, to receive six beaters which operate on the grain, and separate it from the straw in the progress of their revolutions. The beaters are of wrought metal, they are three quarters of an inch thick by one and a half inch deep, are grooved in the metallic heads, and keyed with three keys to each beater; and hooped around each head with a wrought iron hoop. These beaters have diagonal notches on each of their edges, which are so constructed that they beat and comb at the same time. As it will happen that the first edges will become dull by long use; by inverting the cylinder which can be easily done, a fresh set of edges are brought to bear upon the grain, and when these two sets of edges become dull or blunt; by unkeying the beaters and inverting them two new sets of edges can be brought into use.

The cylinder rests and revolves upon steps of brass or other metal fixed in a metallic frame or box. The band or gearing which connects the drum with the cylinder is at an angle of forty five degrees, therefore in order that the revolutions of the cylinder, may press equally upon every part of the steps in which it rests and revolves, the steps are fixed in the frame or box, obliquely at an angle of the same extent. The advantage of the steps being fixed thus obliquely is this: that under any inordinate or unequal pressure upon the cylinder, it is rendered capable of relieving itself equally in all parts of the concave bed in which it revolves.

To render additional aid to the cylinder in this effort of relief, there are wrought iron stirrups, having a bearing upon the upper steps and enclosing them which are attached each to a steel spring with a set screw so as to yield and relieve as the pressure on the cylinder may require.

The ends of the metallic frame, on which the cylinder revolves may be screwed to legs of wood, or may be formed by an arch and extending the metallic legs to such length as to be affixed in wooden sills, at option. The metallic heads are of cast metal and receive or revolve on a concave bed, of fourteen wrought iron bars, 12 of which enter into the frame, or box, half an inch at each end. the two outer bars passing entirely through, and being fastened by screw nuts so as to connect the concave bed, and the frame firmly and substantially together.

The size of these bars, forming the concave bed, are three quarters of an inch square, and they are placed at such a distance as to describe one third of the circumference of the cylinder, they can be taken out and inverted, so as to have the advantage of all their edges as may be required.

In front of the frame or box, and attached to it is a table from which the cylinder is fed, having a perpendicular board adjoining the cylinder which is movable, and which can be elevated or lowered at pleasure, so as to regulate the quantity of straw in thrashing.

Upon one end of the axle of the cylinder, is fixed a cast iron pulley or spur wheel. If a pulley or cylinder it will be six and a half inches in diameter, and the breadth on the face five inches so as to receive a five inch band or belt.

It may happen that in some cases, a longer cylinder may be required; in that event the bars forming the concave bed, will be supported in the centre by a cast iron bracket with its angles cut to fit the concave bed on the convex or outer side, so as to prevent their tremulous motion or their bending under very great pressure.

The cylinder is covered by a sheet iron cover, to prevent the dust or straw, from incommoding the person who feeds the machine, suspended to the edge of which is a sheet iron apron, to retard the velocity of the wheat in its passage from the machine, and thereby to prevent waste from its flying too far.

As it respects the master wheel before mentioned, its equilibrium will be preserved by four cast iron cylinders or rollers, placed upon the smaller frame before described, at four equal angles; those rollers will revolve immediately under the master wheel and with it, touching its rim, whereby its equipoise or exact parallel motion will be preserved.

The pivot upon which it revolves will by the operation of these rollers be relieved from strain, and the equilibrium of the wheel will not be effected by the unequal size or power of the animals used in propelling it.

Four levers are attached to this wheel on its rim by screw bolts at equal distances from each other, these levers are each fourteen feet long and have attached to their ends clevises and swingletrees. The machine may be propelled by two or four horses as may suit the convenience or choice of the farmer.

The inventions and improvements in the machine thus described, which distinguish it from all other machines heretofore invented, consists, First. In the invention of the four cast iron cylinders or rollers placed upon the small frame, which revolve

United States Patent

Patent No.: X8040 immediately under the master wheel, and which preserve its
equilibrium and steadiness as before described, and which
is an improvement on the propelling power.

2^d. The invention and application of the metallic brack-
et supporting the upper end of the shaft of the bevel
wheel, as before described.

3^d. The drum or pulley on the end of the horizontal
shaft which connects by a band or gear with the thrashing
cylinder.

4^th. The thrashing cylinder as before described, distinguished
by the peculiar construction of the beaters, and the manner
in which they are attached to the cylinder.

5^th. The cast iron pulley or cylinder attached to the
axis of the thrashing cylinder.

6^th. The invention and introduction of the metallic
box or frame as before described.

7^th. The general construction of the said machine
as being in many respects new and peculiar.

Witnesses
Addison L. Davis.
Herman W Davis.

Daniel Davis.
James Holmes.

[illegible]
[illegible]

(1740 [illegible])
Received and Recorded anew March 6^th 1843
to be made